UNITED STATES PATENT OFFICE.

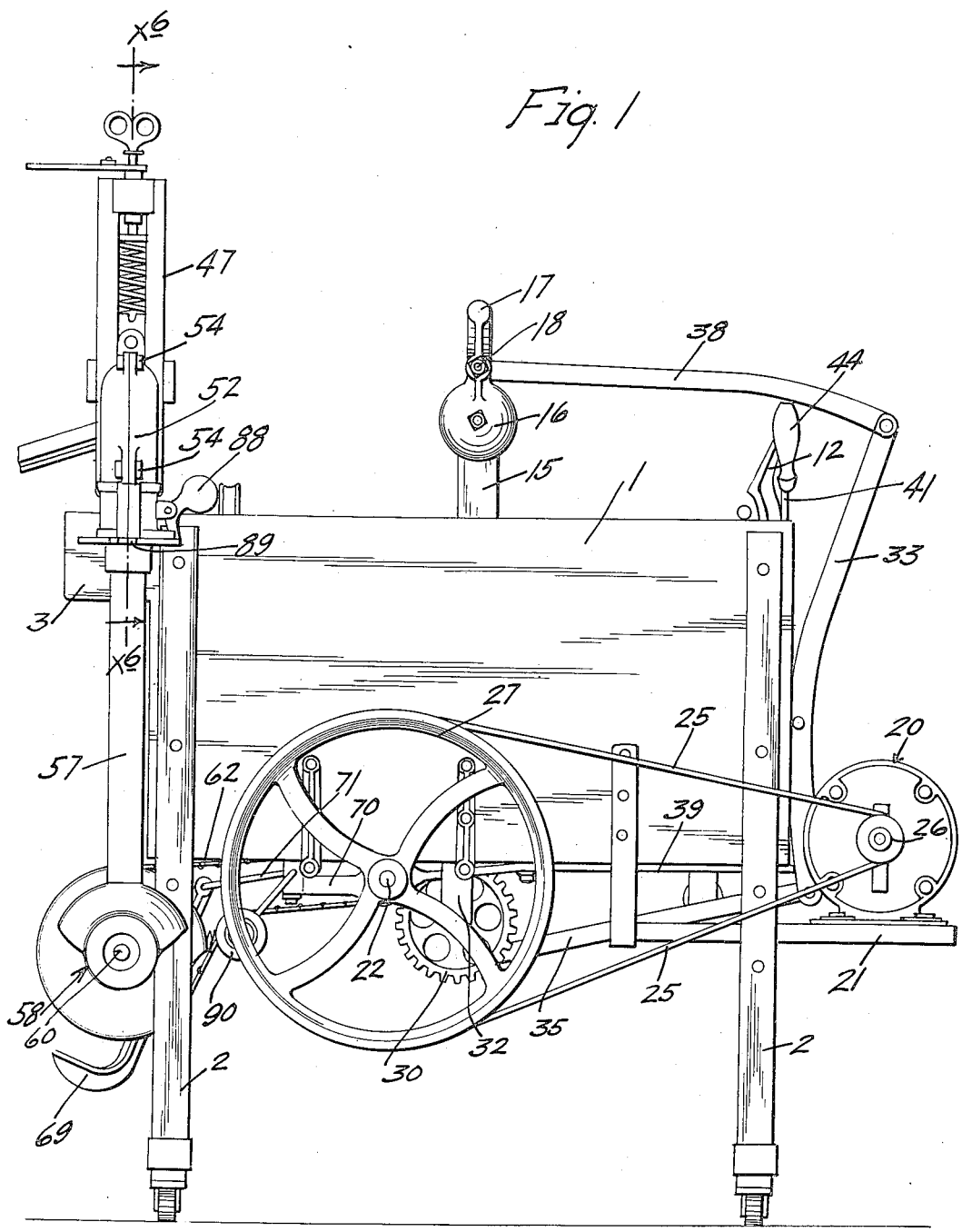

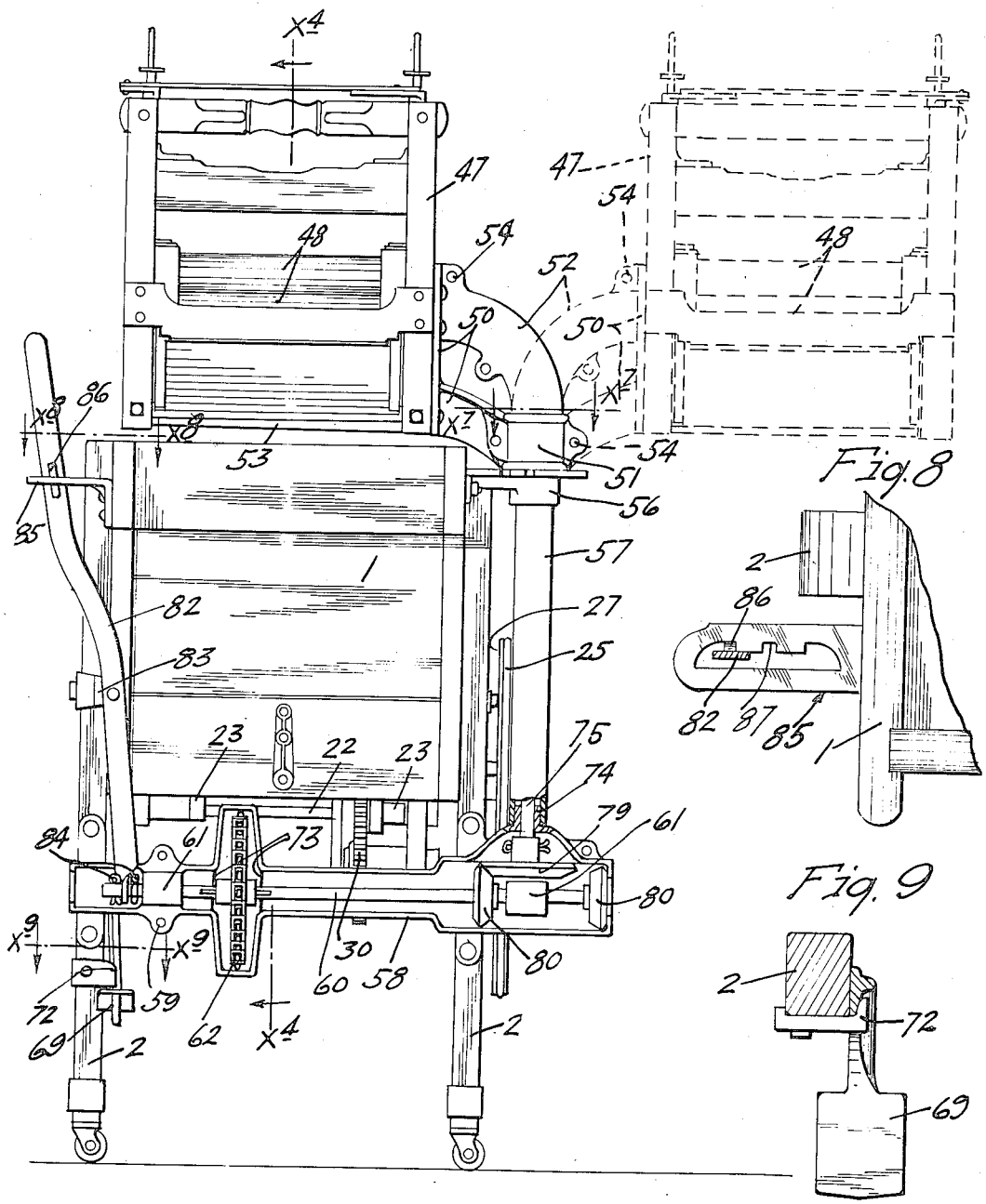

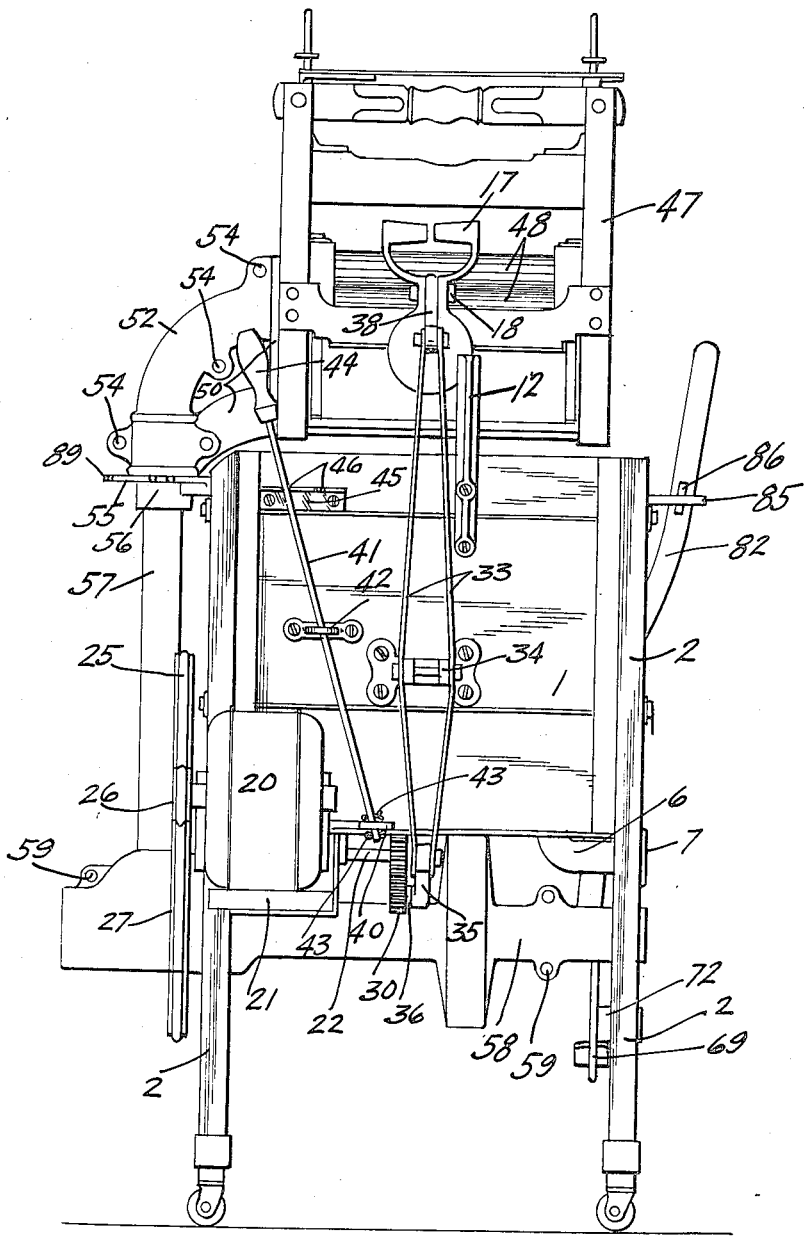

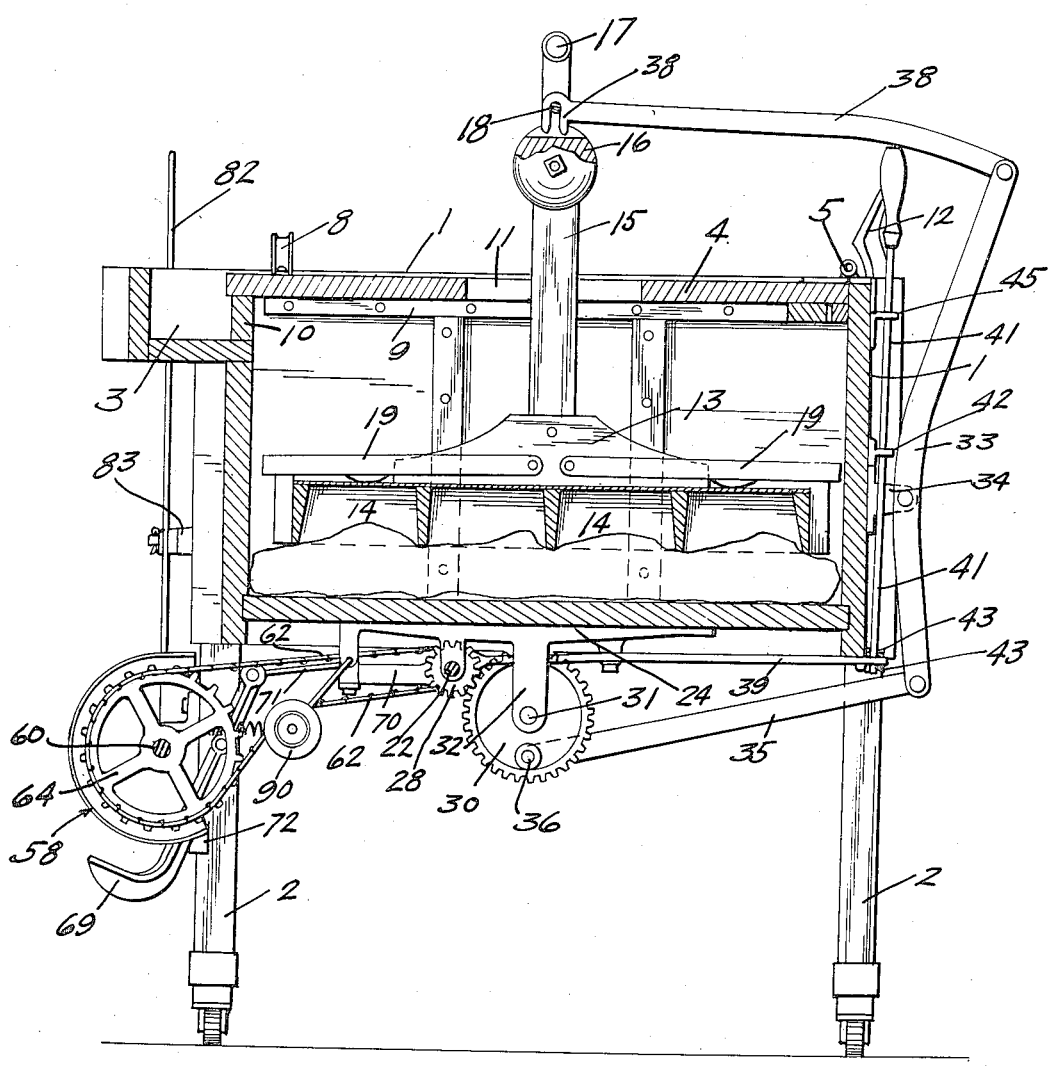

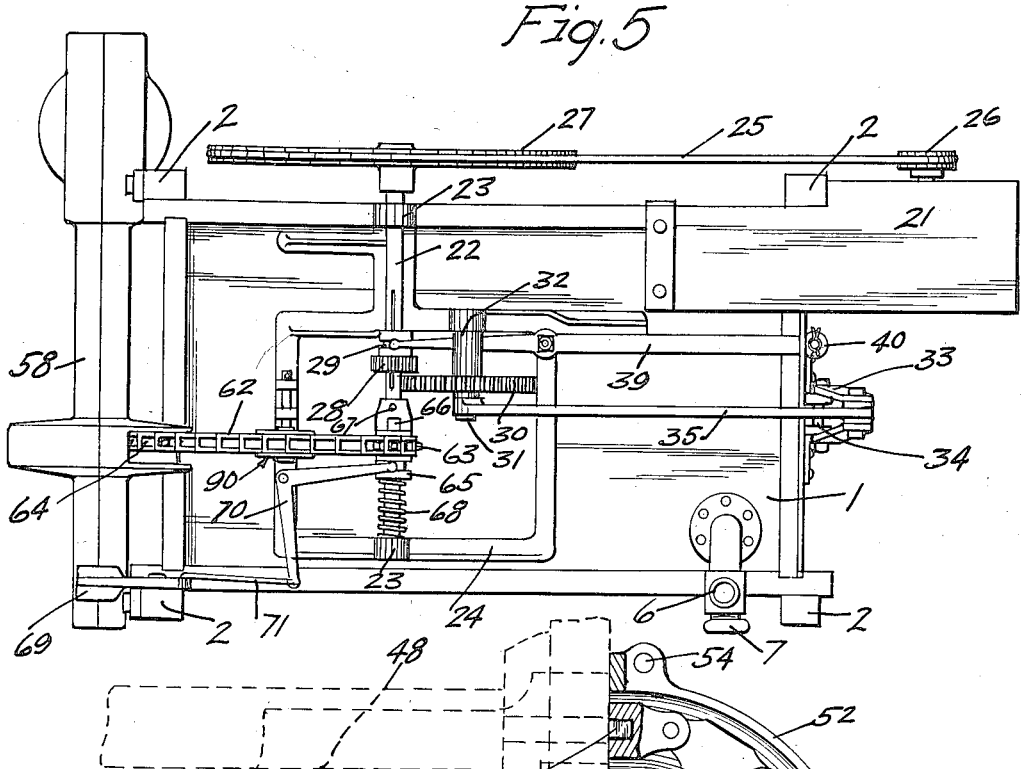
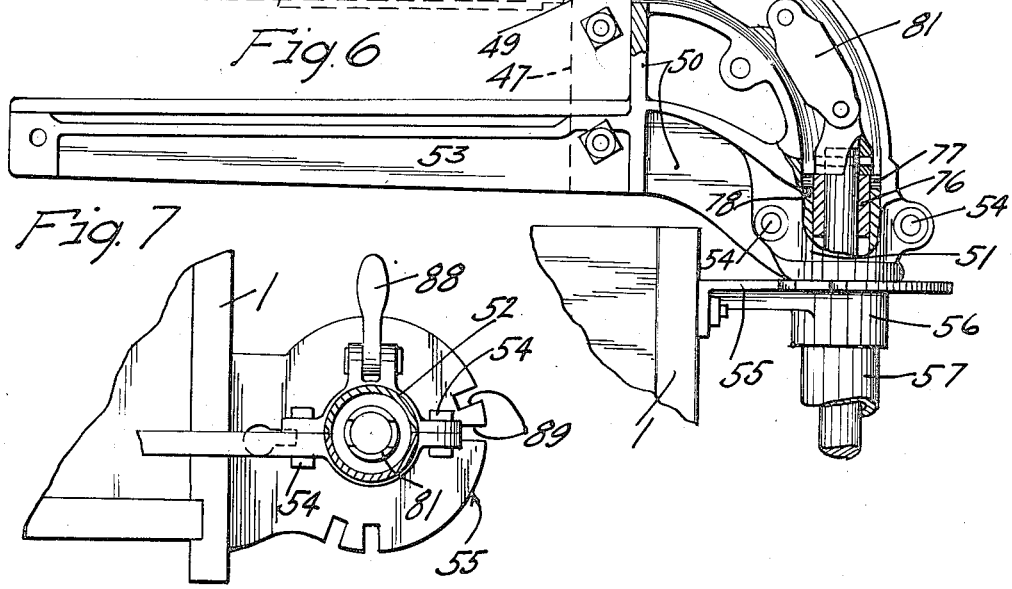

PETER P. KIEL, OF ALBERT LEA, MINNESOTA, ASSIGNOR TO KIEL MANUFACTURING COMPANY, OF ALBERT LEA, MINNESOTA, A CORPORATION OF MINNESOTA.

WRINGER-BRACKET.

1,211,593.           Specification of Letters Patent.     Patented Jan. 9, 1917.

Application filed July 12, 1915. Serial No. 39,223.

*To all whom it may concern:*

Be it known that I, PETER P. KIEL, a citizen of the United States, residing at Albert Lea, in the county of Freeborn and State of Minnesota, have invented certain new and useful Improvements in Wringer-Brackets; and I do hereby declare the following to be a full, clear, and exact description of the invention, such as will enable others skilled in the art to which it appertains to make and use the same.

My invention relates to improvements in power actuated washing machines and particularly to such machines having wringer attachments; and, to this end, it consists of the novel devices and combinations of devices hereinafter described and defined in the claims.

In the accompanying drawings, which illustrate the invention, like characters indicate like parts throughout the several views.

Referring to the drawings, Figure 1 is a side elevation of the improved washing machine and wringer attachment; Fig. 2 is an end elevation of the wringer end of the machine, some parts being shown in different position by means of broken lines; Fig. 3 is an end elevation of the motor end of the machine; Fig. 4 is a view principally in longitudinal vertical section taken on the line $x^4$ $x^4$ of Fig. 2; Fig. 5 is a bottom plan view of the machine; Fig. 6 is a fragmentary detail view, partly in elevation and partly in vertical section taken on the line $x^6$ $x^6$ of Fig. 1, on an enlarged scale, some parts being indicated by means of broken lines; Figs. 7 and 8 are fragmentary views, partly in plan and partly in horizontal sections, taken on the lines $x^7$ $x^7$ and $x^8$ $x^8$ of Fig. 2, respectively, on an enlarged scale; and Fig. 9 is a detail view in horizontal section taken on the line $x^9$ $x^9$ of Fig. 2.

The washing water and the clothes to be washed are placed within a tank 1, which is preferably of rectangular form, and is supported by caster-equipped legs 2. The upper portion of the tank 1, at the left-hand end thereof with respect to Fig. 4, hereinafter referred to as the "wringer end" of the machine, is offset outward to afford a drain 3 for the wringer. A displaceable cover 4 for the tank 1 is hinged at 5 to the right-hand end of said tank with respect to Fig. 4, hereinafter referred to as the "motor end" of the machine.

The numeral 6 indicates a drain tube that leads from the bottom of the tank 1 and is normally closed by a screw plug or stopper 7. The cover 4 is raised and lowered by a hand piece 8 and rests at its longitudinal edges on cleats 9 secured to the inner side walls of the tank 1 and its free edge portion is provided with a depending flange 10, which extends into the drain 3 and rests on the bottom thereof. Extending longitudinally through the central portion of the cover 4 is a slot 11 and secured to the motor end of the tank 1 is an oblique stop or rest bracket 12, which limits the opening movement of the cover 4.

For working the clothes within the tank 1, I preferably mount within the tank 1 a dasher of the type described and claimed in my U. S. Patent 933,183, issued to me of date September 7, 1909, and entitled "Washing machine." As this dasher does not form a part of my present invention, it is only necessary to note the dasher head 13 having a multiplicity of air chambers or pockets 14, operating lever or handle-bar 15 having, at its upper end, a two-part weight 16, terminating in a hand piece 17 through which extends a bolt 18, and reversely extended thrust arms 19 pivotally secured to the dasher head.

An electric motor, indicated as an entirety by the numeral 20, is supported on a shelf 21, which, in turn, is located beneath the tank 1 and supported from said tank and the legs 2, at the motor end of the machine. A driving or main shaft 22 extends transversely of the tank 1 and is journaled in depending bearings 23, integrally formed on a skeleton metal frame 24, rigidly secured to the bottom of the tank 1. This shaft 22 is driven from the motor 20 by a belt 25, which runs over a relatively small grooved wheel 26 keyed to the shaft of the motor 20 and a relatively large grooved wheel 27 keyed to one end of the shaft 22.

The dasher head 13 is oscillated from the shaft 22 by the following connections. Mounted on the shaft 22, for rotation therewith, but with freedom for sliding movement thereon, is a spur pinion 28, having integrally formed with its hub a shipper collar 29 and which pinion meshes with a spur gear 30 keyed to a shaft 31 journaled in a depending bearing 32 on the frame 24. A vertically extended lever 33 is intermediately fulcrumed to a bearing bracket 34 rigidly secured to the motor end of the tank 1. The lower or short end of the lever 33 is connected to the gear 30 by a crank connection in the form of a link 35 pivoted, at one end, to the lever 33 and having its other end eccentrically pivoted to the gear 30 by a crank pin 36. The upper or long end of the lever 33 is connected to the operating lever 15 of the dasher by a long link 37. One end of this link 37 is permanently pivoted to the lever 33 and its other or free end is provided with a notched head 38, which embraces the bolt 18 and detachably connects the link 37 to the operating lever 15 of the dasher.

The pinion 28 is moved into and out of mesh with the gear 30 by a shipper lever 39 intermediately fulcrumed to the frame 24. The short end of the lever 39 is connected to the shipper collar 29 in the customary manner and the long end thereof is expanded and has formed therein an eye 40, through which projects the lower end of a vertically extended lever 41, constructed from a rod of spring steel. This rod 41 is loosely fulcrumed in a bracket 42 secured to the motor end of the tank 1. Cotter pins 43 are extended through the lever 41 on either side of the shipper lever 39 to hold said lever against endwise movement in either direction. On the upper end of the lever 41, is a handle 44 by which said lever may be operated. The lever 41 is held in either of its extreme positions by a bracket 45 having formed therein a pair of horizontally spaced notches 46 with which the lever 41 engages by a lateral springing movement. Obviously, in one extreme position of the lever 41, the pinion 28 is in mesh with the gear 30, and in the other extreme position thereof, it is out of said gear. The purpose of making the lever 41 of spring metal is that in throwing the pinion 28 into mesh with the gear 30, in case the teeth should strike, the lever 41 may be sprung into contact with the proper notch 46 and then when the teeth of the moving pinion 28 get into proper alinement with the teeth of the gear 30, the spring tension of the lever 41 will automatically move the pinion 28 into mesh with the gear 30.

Referring now to the wringer attachment, the numeral 47 indicates the frame and the numeral 48 indicates the wringing rollers of a standard wringer. The lower roller 48 is provided with the customary squared shaft 49 by which the same is ordinarily rotated by a crank or other suitable means. It is, of course, understood that the upper roller is driven by suitable gears, not shown, from the lower roller and the customary roller tension devices and release mechanism are provided, but, for the purpose of this case, it will not be necessary to consider the same.

The wringer is mounted on the tank 1 for complete rotation in a horizontal plane around a vertical axis by a bracket 50 bolted to one of the uprights of the wringer frame 47. This bracket 50 has formed therewith a two-part clamp 51, a vertically extended two-part segmental casing 52 and a horizontal arm extension 53. Corresponding sections of the clamp 51 and casing 52 are integrally formed with the bracket 50 and the two sections of the clamp 51, and also the two sections of the casing 52 are detachably connected by nut-equipped bolts 54 passed through pairs of perforated lugs on said clamp and casing. It is important to note that the casing 52 forms an extension of the clamp 51 and the squared shaft of the lower wringing roller 48 extends into the upper end portion of said casing. The bracket arm 53 is embraced by the bifurcated lower ends of the uprights of the wringer frame 47 and is rigidly bolted thereto. The bracket 52 rests on a horizontal bracket 55 bolted to one side of the tank 1 and has integrally formed therewith a vertically extended bearing hub 56 in which is journaled a tubular sleeve 57. The upper end of said sleeve 57 extends into the clamp 51 and is frictionally clamped between the sections thereof by the bolts 54 of said clamp. Obviously, this sleeve 57 forms the axle with which the wringer bracket rotates.

Forming a part of the casing 52 and the tubular sleeve 57 is a horizontally extended vertically divided casing 58. The sections of this casing 58 are detachably connected by nut-equipped bolts 59 passed through pairs of perforated lugs on the sections of said casing. One section of the casing 58, to wit: the fixed, is rigidly bolted to the legs 2 below the tank 1 and at the wringer end of the machine.

A counter-shaft 60 is mounted within the casing 58 and is journaled in bearing 61 integrally formed with the fixed section of the casing 58 with freedom for a limited endwise movement. The counter-shaft 60 is driven from the main shaft 22 by a sprocket chain 62, which runs over a relatively small sprocket wheel 63 on the main shaft 22 and a relatively large sprocket wheel 64 on the counter-shaft 60. The sprocket wheel 63 is loosely mounted on the main shaft 22, having, on one end of its hub, a shipper collar 65 and having, on the other end of said hub, a half clutch member 66 normally interlocked with a coöperating half clutch member 67 pinned to the main shaft 22. A coil spring 68 encircling the main shaft 22, is compressed between the shipper collar 65 and adjacent bearing 23, and yieldingly holds the clutch member 66 interlocked with the clutch members 67. A foot lever 69 fulcrumed to one of the legs 2, below the casing 58, is provided for sliding the sprocket wheel 63 on the main shaft 22 to move the clutch member 66 out of engagement with the clutch member 67. A bell crank 70 and link 71 afford the connections between the foot lever 69 and the shipper collar 65. The bell crank 70 is fulcrumed on the frame 24 and one end thereof is interlocked with the shipper collar 65 and the other end thereof is connected to the foot lever 69 by the link 71. By pressing downward on the foot lever 69, the bell crank 70 will be oscillated to cause the sprocket wheel 63 to run idle on the main shaft 22. By a slight lateral movement of the foot lever 69, while the same is pressed down, said lever may be interlocked with a projecting lock lug 72 on the adjacent leg 2, for holding the sprocket wheel 63 in an idle position. The sprocket wheel 64 is keyed to the counter-shaft 60 for rotation therewith, but with freedom to permit said shaft 60 to be moved endwise therethrough. Reversely extended stop shoulders 73, integrally formed with the fixed casing member 58, engage the hub of the sprocket wheel 64 to prevent lateral movement thereof, at the time the shaft 60 is moved endwise therethrough.

Integrally formed with the casing 58 and projecting upward therefrom, is a bearing hub 74 onto which the lower end of the sleeve 57 is telescoped. The lower end of an upright shaft 75 is journaled in this bearing hub 74 and the upper end thereof is journaled in a bushing 76, telescoped into the upper end of the sleeve 57. The bushing 76 is held against rotation in sleeve 57 by a pair of radially projecting lugs 77 mounted in notches 78, formed in the upper end of said sleeve 57. To the lower end of the shaft 75 is keyed a bevel gear 79 with which either one of a pair of diametrically opposite bevel pinions 80 keyed to the counter-shaft 60 may be moved into mesh. The lower member of an upwardly extended flexible shaft 81, mounted in casing 52, is pinned to the upper end of the shaft 75 and the upper member of said flexible shaft is provided with a socket, which is square in cross section and detachably and telescopically receives the squared shaft of the lower wringing roller 48.

A vertically extended hand lever 82 is provided for moving the shaft 60 endwise in the casing 58, for moving the pinions 80 into and out of mesh with the bevel gear 79 for changing the direction of rotation of the wringing rollers 48, or for setting said pinions in intermediate positions, so that the wringing rollers will stand still. This lever 82 is intermediately fulcrumed to the bracket 83 on the leg 2, to which the lock lug 72 is secured, and its lower or depending end is perforated to receive the adjacent end of the counter-shaft 60. A pair of cotter pins 84 passed through the shaft 60, on either side of the lever 82, hold said lever against longitudinal movement on said counter-shaft. The upper end portion of the lever 82 projects through a slotted lock plate 85, rigidly secured to the extension 3 of the tank 1. As shown, the lever 82 is provided with a lock lug 86, yieldingly held by the spring tension of said lever interlocked with any one of three horizontally spaced lock notches 87, formed in the lock plate 85. When the lock lug 86 extends into the intermediate lock notch 87, the bevel gear 79 is out of mesh with both bevel pinions 80 and the driving connections from the counter-shaft 60 to the lower wringing roller 48 are in idle positions.

By moving the lever 82 into a position to carry its lock lug 86 into either one of the outer lock notches 87, one of the pinions 80 will be moved into mesh with the bevel gear 79, depending on which way it is desired to rotate the wringing rollers 48.

A wringer is locked in several predetermined positions against horizontal swinging movement by a gravity actuated lock dog 88 pivoted to the detachable member of the bearing 51 and adapted to engage any one of a plurality of circumferentially spaced lock notches 89, formed in the horizontal flange of the bearing hub 56. A chain tightener 90 for the sprocket chain 62 is carried by the frame 24.

From the above description, it is evident that while the motor 20 is running, and the pinion 28 is out of mesh with the gear 30 and the clutch 66—67 is separated, only few of the movable parts of the machine are in motion. By operating the hand lever 41 to move the pinion 28 in mesh with the gear 30, the driving connections for oscillating the dasher will be set in motion.

It is, also, evident that the wringer may be used while the dasher is working or while the same is idle.

The wringing rollers 48 may be set in motion or stopped by either the hand lever 82 or the foot lever 69.

The flexible shaft 81, which forms a part of the driving connections for the wringing rollers, is highly important, as it greatly simplifies said connections and it also permits complete horizontal swinging movement of the wringer around a vertical axis. This mounting of the wringer permits the same to be used, at one end of the machine or at one side thereof, as well as in intermediate positions.

What I claim is:—

1. The combination with a support, of a wringer including a frame and a pair of coöperating wringing rollers, a vertically disposed driven shaft, a bracket connecting the frame of the wringer to the support for horizontal swinging movement around the driven shaft, said bracket having a casing section, and a flexible shaft in the casing section and connecting the driven shaft with one of the wringing rollers.

2. The combination with a support, of a wringer including a frame and a pair of coöperating wringing rollers, a vertically disposed driven shaft, a bracket connecting the frame of the wringer to the support for horizontal swinging movement around the driven shaft, said bracket having a casing section into which one of the trunnions of the wringing rollers projects, and a flexible shaft attached at one end to the driven shaft and having at its other end a socket arranged to be detachably interlocked, by an endwise movement of the flexible shaft, with the trunnion projecting into said casing.

3. The combination with a support, of a wringer including a frame and coöperating wringing rollers, a bracket secured to said frame, having a depending sleeve journaled in bearings on the support and also having a casing section forming a continuation of the upper end of said sleeve, and a driven shaft journaled in the sleeve, having a flexible section mounted in the casing section of said bracket and connecting the driven shaft with the journal of one of the wringing rollers.

4. The combination with a support, of a wringer including a frame and a pair of coöperating wringing rollers, a bracket secured to said frame and having an axially divided clamp, draw bolts connecting the sections of said clamp, an upright sleeve having its upper end secured between the sections of the clamp, said sleeve being journaled in bearings on the support, a driven shaft journaled in the sleeve, and a flexible shaft section connecting said driven shaft with the journal of one of the said coöpating wringing rollers.

5. The combination with a support, of a wringer including a frame and a pair of coöperating wringing rollers, a bracket secured to said frame, having a depending sleeve and also having a casing section forming a continuation of the upper end of said sleeve, the upper end of the sleeve being journaled in a bearing on the support, a main casing provided with a bearing hub axially alined with the bearing on the support and having the lower end of the sleeve journaled thereon, a driven shaft mounted in the sleeve and journaled in said bearing hub, driving connections mounted in the main casing for driving the driven shaft in either direction, at will, and a flexible shaft mounted in the casing section and connecting the driven shaft with one of the journals of one of the wringing rollers.

In testimony whereof I affix my signature in presence of two witnesses.

PETER P. KIEL.

Witnesses:
BERNICE G. WHEELER,
HARRY D. KILGORE.